(12) United States Patent
Leven et al.

(10) Patent No.: US 10,419,364 B2
(45) Date of Patent: Sep. 17, 2019

(54) METHOD FOR OPERATING A LINE SWITCHING COMPONENT, LINE SWITCHING COMPONENT, LINE CARD, AND NETWORK NODE THEREOF

(71) Applicant: Alcatel Lucent, Boulogne Billancourt (FR)

(72) Inventors: Andreas Leven, Stuttgart (DE); Lars Dembeck, Stuttgart (DE); Juergen Loehr, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 15/749,569

(22) PCT Filed: Sep. 13, 2016

(86) PCT No.: PCT/EP2016/071578
§ 371 (c)(1),
(2) Date: Feb. 1, 2018

(87) PCT Pub. No.: WO2017/046095
PCT Pub. Date: Mar. 23, 2017

(65) Prior Publication Data
US 2018/0234357 A1   Aug. 16, 2018

(30) Foreign Application Priority Data
Sep. 15, 2015   (EP) .................................... 15306414

(51) Int. Cl.
*H04B 10/00* (2013.01)
*H04L 12/939* (2013.01)
(Continued)

(52) U.S. Cl.
CPC ........... *H04L 49/55* (2013.01); *H04B 10/038* (2013.01); *H04L 49/30* (2013.01);
(Continued)

(58) Field of Classification Search
USPC ......................................................... 398/1–9
See application file for complete search history.

(56) References Cited

U.S. PATENT DOCUMENTS 5,886,801 A    3/1999  Van Deventer
6,744,760 B1 * 6/2004  Solheim .............. H04J 14/0283
                                                   370/366
(Continued)

FOREIGN PATENT DOCUMENTS

EP    2536072    12/2012

OTHER PUBLICATIONS

Wu, Ming C.; Optical Bench Technology Holds Promise; Jun. 3, 1999; p. 1-4; XP055252637; Retrieved from the Internet: URL:http://www.embedded.com/print/4038281; [retrieved on Feb. 23, 2016].
(Continued)

*Primary Examiner* — Agustin Bello
(74) *Attorney, Agent, or Firm* — McCracken & Gillen LLC

(57) ABSTRACT

The embodiments of the invention relate to a line switching component separable from a line card of a network node. The line switching component contains at least one input port for receiving an optical input signal from an optical transport network and at least one output port for transmitting an optical output signal to the optical transport network. The line switching component further contains at least one further output port configured to be connected to an input port of at least one optical interface of the line card and at least one further input port configured to be connected to an output port of the at least one further optical interface of the line card. The line switching component further contains a switchable optical path system configured to operate the line
(Continued)

switching component in a first operation mode and to operate the line switching component in a second operation mode.

18 Claims, 9 Drawing Sheets

(51) Int. Cl.
*H04L 12/935* (2013.01)
*H04Q 11/00* (2006.01)
*H04B 10/038* (2013.01)

(52) U.S. Cl.
CPC ..... *H04Q 11/0005* (2013.01); *H04Q 11/0062* (2013.01); *H04Q 11/0071* (2013.01); *H04Q 2011/0043* (2013.01); *H04Q 2011/0081* (2013.01)

(56) References Cited

U.S. PATENT DOCUMENTS

| | | | | |
|---|---|---|---|---|
| 6,763,190 B2* | 7/2004 | Agrawal | ............ | H04J 14/0227 370/216 |
| 6,892,032 B2* | 5/2005 | Milton | ................ | H04J 14/0206 398/3 |
| 7,072,584 B1* | 7/2006 | Lichtman | ............ | H04J 14/0283 393/3 |
| 7,548,693 B2* | 6/2009 | Kimura | ............... | H04J 14/0291 398/45 |
| 7,570,886 B1* | 8/2009 | Afferton | ............. | H04J 14/0227 398/45 |
| 8,165,467 B2* | 4/2012 | Fukashiro | ........... | H04J 14/0204 398/128 |
| 9,723,385 B2* | 8/2017 | Hu | ..................... | H04Q 11/0005 |
| 2002/0171892 A1* | 11/2002 | Marmur | ............... | H04B 10/032 398/91 |
| 2002/0180957 A1* | 12/2002 | Lauder | ................ | H04J 14/0206 356/124 |
| 2002/0181037 A1* | 12/2002 | Lauder | ................ | H04B 10/032 398/3 |
| 2010/0034532 A1* | 2/2010 | Ghelfi | ................ | H04J 14/0204 14/204 |
| 2018/0234357 A1* | 8/2018 | Leven | ..................... | H04L 49/55 |

OTHER PUBLICATIONS

Office Action issued in related Japanese Application No. 2018-532810 dated Feb. 12, 2019.

* cited by examiner

METHOD FOR OPERATING A LINE SWITCHING COMPONENT, LINE SWITCHING COMPONENT, LINE CARD, AND NETWORK NODE THEREOF

FIELD OF THE INVENTION

The present invention relates to transmission reliability in telecommunication systems, and more particularly but not exclusively, to a system architecture for line cards having optical interfaces.

BACKGROUND OF THE INVENTION

This section introduces aspects that may be helpful in facilitating a better understanding of the invention. Accordingly, the statements of this section are to be read in this light and are not to be understood as admission about what is in the prior art.

In telecommunication systems information is typically exchanged via optical fibers. The most popular transmission formats are SDH/Sonet (SDH=Specification and Desription Language, SONET=Synchronous Optical Networking), OTN (OTN=Optical Transport Network) as defined by ITU-T (ITU-T=International Telecommunications Union-Telecommunication Standardization Sector) and DWDM (DWDM=Dense Wavelength Division Multiplexing).

The optical fibers are used to connect routers or other network elements of an optical telecommunication network. Optical interfaces for these optical fibers are typically located on so-called line cards. Since such network elements are usually intended to interface several other network elements, typically multiple optical interfaces are provided, several of them may be located on a line card. Likewise, one network element can have many line cards.

When such a line card is affected by a hardware failure or even the network element having implemented the line card is affected by a serious hardware failure, typically all optical interfaces implemented on that line card fail along with the line card. While this is acceptable for data traffic that is terminated and/or processed in the particular network element ("terminated traffic"), it is also affecting (i.e. interrupting) all further data traffic that is simply forwarded ("passed through") by the line card from one of its optical interface to a further one of its optical interfaces. The interruption of this pass-through traffic is a severe drawback that needs to be addressed by additional protection mechanisms. Typically, the network elements are capable of protecting data traffic by means of so-call equipment protection with redundancy when a line card fails, i.e. having at least one additional line card ("protecting card") already installed in the network element which can take over the function of the line card ("protected card"), or by means of so-called network protection via different ports of the network element when an optical link to the network element fails. Such an additional line card increases system cost and complexity. In case of e.g. IP routers (IP=Internet Protocol) the cost for an additional line card can be in the range of e.g. more than 10.000€. Both protection mechanisms, equipment protection and network protection, are complementary mechanisms which can be applied simultaneously.

In case of telecommunication systems which are very important and which should not fail such as government networks or military networks a higher redundancy is required and therefore, additional optical fibers ("protecting fibers") may be installed in addition to main optical fibers ("protected fibers"). These protecting fibers may be connected to protecting cards to increase a protection mechanism for the data traffic and which only take over the data traffic when one of the protected fibers or one of the protected cards fails. Such additional fiber connections are expensive as well, especially when going over longer distances, e.g. tens, hundreds or thousands of kilometers.

SUMMARY

Objectives of the embodiments of the invention are to reduce costs for data traffic protection measures and to increase protection of data traffic in optical telecommunication networks.

The objectives are achieved by a line switching component separable from a line card of a network node. The line switching component contains at least one input port for receiving an optical input signal from an optical transport network and at least one output port for transmitting an optical output signal to the optical transport network. The line switching component further contains at least one further output port configured to be connected to an input port of at least one optical interface of the line card and at least one further input port configured to be connected to an output port of the at least one optical interface of the line card. The line switching component even further contains a switchable optical path system configured to operate the line switching component in a first operation mode by receiving the optical input signal at the at least one input port and by providing the optical input signal via the at least one further output port to the at least one optical interface for further processing of the optical input signal at the at least one optical interface and by receiving the optical output signal from the at least one optical interface at the at least one further input port for transmitting the optical output signal via the at least one output port and to operate the line switching component in a second operation mode by forwarding the optical input signal from the at least one input port to the at least one output port for transmitting the optical input signal as the optical output signal, when a malfunction has occurred at the line card or at the network node or when the second operation mode has been enforced. An enforcement may be applied during a malfunction for example to avoid a switching between the first operation mode and the second operation mode, if intermittent states appear which do not signal a ultimate malfunction. The enforcement may be also applied outside a malfunction for example to support maintenance works at the line card or at a network node which contains the line card.

The objectives are further achieved by a line card for a network node. The line card contains at least one optical interface for receiving an optical input signal from an optical transport network at an input port of the at least one optical interface and for transmitting an optical output signal to the optical transport network from an output port of the at least one optical interface. The line card further contains at least one separable line switching component as described above and in the following paragraphs which is connected to the at least one optical interface.

The objectives are even further achieved by a network node which contains at least one line card that has the features as described in the previous paragraph.

The objectives are even further achieved by a method for operating a line switching component which is separable from a line card of a network node. The method contains the step of operating the line switching component in a first operation mode by receiving from an optical transport network an optical input signal at at least one optical interface of the line card via the line switching component for further processing of the optical input signal at the at least one optical interface and by transmitting an optical output signal from the at least one optical interface via the line switching component to the optical transport network, when the line switching component is connected to the line card. The method further contains the step of observing a malfunction at the line card or at the network node or a reception of an explicit signal for switching the line switching component from the first operation mode to a second operation mode. The method even further contains the step of operating the line switching component in the second operation mode by forwarding the optical input signal from an input port of the line switching component to an output port of the line switching component for transmitting the optical input signal as the optical output signal, when the malfunction has been occurred or when the explicit signal has been received or when the line switching component is disconnected from the line card.

The embodiments provide a line switching component, a line card, a network node and a method which allow pass-through traffic to survive and to be forwarded to another network node when a line card or a network node has a malfunction. The embodiments further allow the pass-through traffic to survive and to be forwarded to another network node during a time period, when the damaged line card is replaced by a new line card or when the damaged network node is replaced by a new network node. Thereby, a continuous operation of pass-through traffic can be guaranteed during line card failures or other failures and during replacement of defect components having an impact on a successful operation of a corresponding line card. The embodiments provide a further advantage of reducing costs regarding requirements to provide redundancy in a telecommunication system when a line card or a network node fails which has installed a corresponding line card.

In one embodiment, the line switching component further contains a control system which is configured to observe a malfunction at the line card or at the network node or to observe an enforcement for the second operation mode based on a change of a control signal applied to the control system. The preferred embodiment provides the advantage that the line switching component itself is able to determine whether a switching between the first operation and the second operation mode is required.

Preferably, the control system may be configured to determine the malfunction when the control signal is not detectable. This provides the advantage that the malfunction can be determined even if the defect of the line card or the network node affects and prevents a generation of the control signal.

According to an alternative embodiment, the line card or the network node which contains the line card is configured to observe the malfunction and is further configured to instruct the line switching component preferably by a control signal via a control line to operate either in the first operation, when no malfunction is observed or to operate in the second operation mode, when a malfunction has been observed.

With respect to a further embodiment, the line switching component may further contain an electrical component such as a capacitor to store electrical energy and the electrical component may be configured to provide a predefined supply voltage based on the stored electrical energy for operating the line switching component in the second operation mode, when the line switching component is disconnected from the line card. The further embodiment allows applying also components such as switches for the switchable optical path system, which always require the predefined supply voltage to operate the line switching component in the first operation mode or the second operation mode.

In a further preferred embodiment, the line switching component further contains at least one switch which is configured to provide the optical input signal to the at least one optical interface and to receive the optical output signal form the at least one optical interface during the first operation mode and to forward the optical input signal from the at least one input port to the at least one output port during the second operation mode.

According to one of the preferred embodiments, the line switching component further contains at least one further switch. The at least one switch and the at least one further switch are configured to connect the at least one input port to the at least one further output port via an input port of the at least one switch and a second output port of the at least one switch and to connect the at least one further input port to the at least one output port via a second input port of the at least one further switch and an output port of the at least one further switch during the first operation mode. The at least one switch and the at least one further switch are further configured to connect the at least one input port to the at least one output port via the input port of the at least one switch, a first output port of the at least one switch, a first input port of the at least one further switch and an output port of the at least one further switch during the second operation mode.

In a further preferred embodiment, the at least one switch may be configured to require a predefined supply voltage for the first operation mode and no supply voltage for the second operation mode. Switches which provide such a functionality are for example MEMS switches (MEMS=Micro Electro Mechanical System). In such a case, the line switching component may be configured to operate passively in the second operation mode without any power supplied to the line switching component, when the line switching component is disconnected from the line card or no power is provided by the line card to the line switching component. The further preferred embodiment provides the benefit to operate the line switching component in the second operation mode without any power consumption and without any need to connect manually a supporting power supply such as a storage battery to the line switching component.

In one alternative embodiment, the line switching component may be configured to operate the at least one data interface and at least one further data interface of the line card at a same time in same operation modes of the first operation mode and the second operation mode. In such a case, a single line switching component can be used to allow pass-through traffic to survive and to be forwarded to another network node for two or more data interfaces of the line card. This provides the advantage to further reduce installation costs with respect to redundancy requirements.

According to a further alternative embodiment, the line switching component may be configured to operate the at least one data interface and at least one further data interface of the line card separately in opposite operation modes, e.g. such as a first data interface in the first operation mode and a second data interface in the second operation mode during a first time period and the first data interface in the second operation mode and the second data interface in the first operation mode during a second time period after the first time period.

Preferably, the line switching component may be a replaceable plug-in component for the line card. This provides the first advantage to allow pass-through traffic to be forwarded to another network node not only is case of a failure of the line card or the network node when the line card is installed but also when the line card is exchanged with another new line card. Furthermore, the line switching component can be reused for the new line card. There is no need to disconnect the optical fibers. This allows pass-through traffic to be unaffected during line card replacement, e.g. the line switching component can continue to operate in the second operation mode while the line switching component is moved from one line card to another line card.

According a further embodiment, the line card may further contain at least one mounting fixture which is configured to mount the line switching component at the line card.

In an even further embodiment, the line card may further contain a control signal generation unit which may be configured to provide a control signal to the at least one separable line switching component for setting an operation mode at the at least one separable line switching component. Alternatively, the control signal may be provided by a separate power supply of the network node.

Further advantageous features of the embodiments of the invention are defined and are described in the following detailed description.

BRIEF DESCRIPTION OF THE FIGURES

The embodiments of the invention will become apparent in the following detailed description and will be illustrated by accompanying figures given by way of non-limiting illustrations.

FIG. 4 b) shows schematically with respect to the line switching component of FIG. 3 an internal transmission path for input data traffic when the two switches are adjusted according to the second operation mode.

DESCRIPTION OF THE EMBODIMENTS

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

A splitting of processing functions across processing units shown in the Figures is not critical, and as can be understood by those skilled in the art that the number of processing units, the number of processing functions and an allocation of the processing functions to the processing units may vary without departing from the scope of the embodiments of the invention as defined in the appended claims. The number of the steps for performing the method(s) is not critical, and as can be understood by those skilled in the art that the number of the steps and the sequence of the steps may vary without departing from the scope of the embodiments of the invention as defined in the appended claims.

Figure 1:
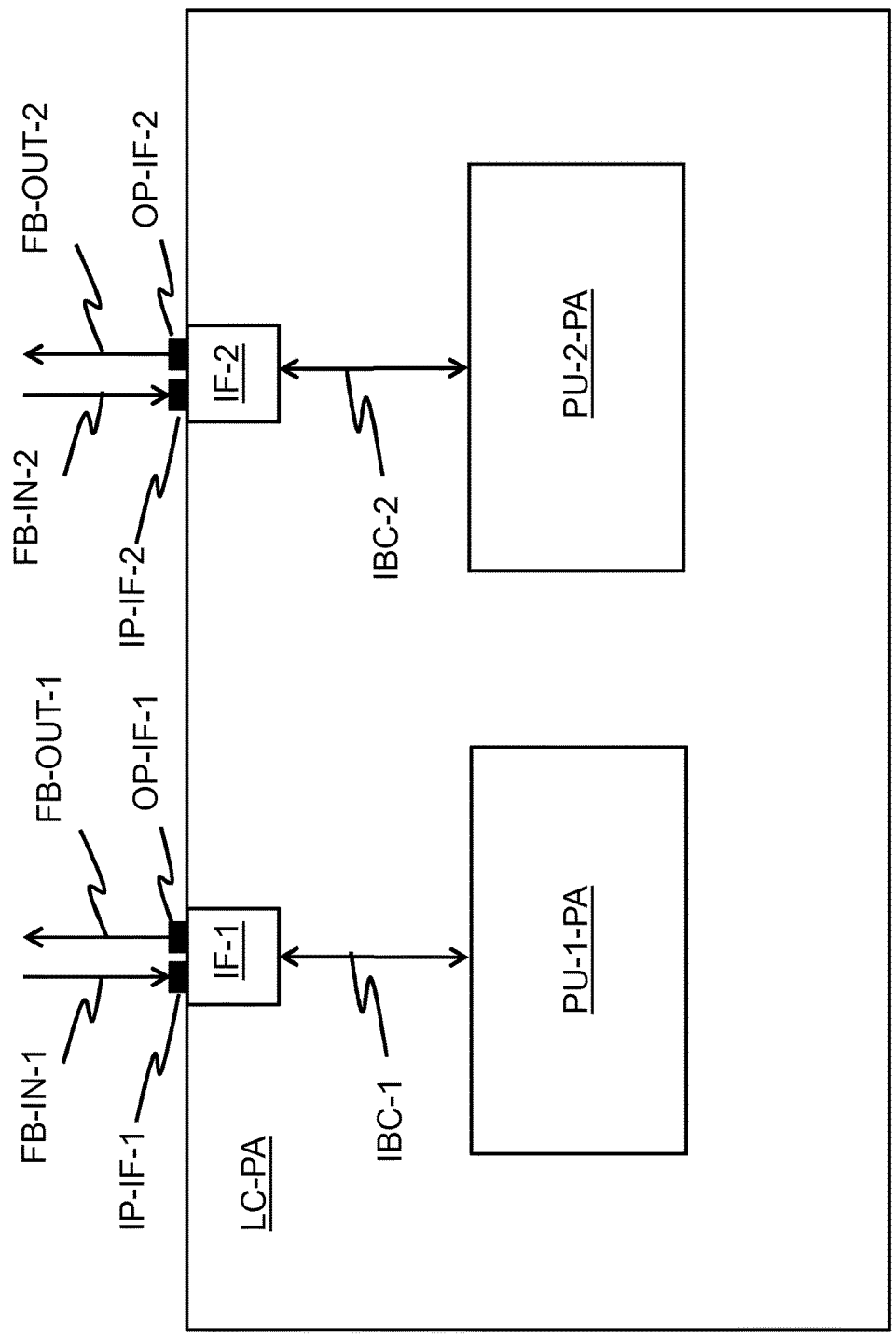
FIG. 1 shows schematically a block diagram of a conventional line card and optical fibers connected to the line card.

FIG. 1 shows schematically a block diagram of a conventional line card LC-PA for an optical transport network and of optical fibers FB-IN-1, FB-OUT-1, FB-IN-2, FB-OUT-2 which are connected to the line card LC-PA. The optical transport network is not shown for simplification.

Input optical fibers FB-IN-1, FB-IN-2 provide optical connections from routers, switches or other devices of the optical transport network and output optical fibers FB-OUT-1, FB-OUT-2 provide optical connections to same or further routers, switches or devices of the optical transport network. Same routers, switches or devices may be applied in case of bidirectional connections, which are typically the case. The routers, switches and further routers and switches of the optical transport network are also not shown for simplification.

The line card LC-PA contains exemplarily a first optical interface IF-1 and a second optical interface IF-2. The optical interfaces IF-1, IF-2 may be preferably bidirectional interfaces and may be for example XFP modules (XFP=10 Gigabit Small Form Factor Pluggable). Alternatively the line card LC-PA may contain one optical input/output interface or four or even more optical input/output interfaces. In further alternatives, the interfaces IF-1, IF-2 may be unidirectional interfaces which mean that the first optical interface IF-1 may be for example an optical input interface and the second optical interface IF-2 may be for example an optical output interface.

A first optical input fiber FB-IN-1 is connected to an input port IP-IF-1 of the first optical interface IF-1. A first optical output fiber FB-OUT-1 is connected to an output port OP-IF-1 of the first optical interface IF-1. In a same way, a second optical input fiber FB-IN-2 is connected to an input port IP-IF-2 of the second optical interface IF-2 and a second output fiber FB-OUT-2 is connected to an output port OP-IF-2 of the second optical interface IF-2. The first optical interface IF-1 and the second optical interface IF-2 both are configured to convert optical received signals for example into electrical input signals in input direction and to convert for example electrical output signals into optical transmit signals in output direction.

The line card LC-PA further contains a first processing unit PU-1-PA and a second processing unit PU-2-PA which may be for example electronic circuits on a printed circuit board. The first processing unit PU-1-PA and the second processing unit PU-2-PA each are configured to provide a specific data handling functionality or several data handling functionalities, for handling input data and output data according to an applied transmission format such as SDH/Sonet, OTN, Ethernet or IP. Such data handling functionalities are for example IP routing, Ethernet switching, OTN framing, OTN mapping or OTN switching, as well as the identification of so-called pass-through traffic PTT (see FIG. 2). The first processing unit PU-1-PA may be responsible for handling the input data and the output data of the first optical interface IF-1 and the second processing unit PU-2-PA may responsible for handling the input data and the output data of the second optical interface IF-2. In one alternative, the line card LC-PA may contain a single processing unit being responsible for handling the input data and the output data of both the first optical interface IF-1 and the second optical interface IF-2 or of even more optical interfaces. In further alternative embodiments, a number n (n 2) of processing units may be responsible for handling the input data and the output data of a single optical interface or more generally a number m (m≤1) of processing units may be responsible for handling the input data and the output data of a number n (n≤1) of optical interfaces.

For simplification, no connection between the first processing unit PU-1-PA and the second processing unit PU-2-PA, no connections between the processing units PU-1-PA, PU-2-PA and a so-called backplane or between the processing units PU-1-PA, PU-2-PA and further processing units of a further line card are shown.

The line card LC-PA further contains a first internal bi-directional connection IBC-1 between the first optical interface IF-1 and the first processing unit PU-1-PA and a second internal bi-directional connection IBC-2 between the second optical interface IF-2 and the second processing unit PU-2-PA. The first internal bi-directional connection IBC1-1 provides first electrical input signals from the first optical interface IF-1 to the first processing unit PU-1-PA and first electrical output signals from the first processing unit PU-1-PA to the first optical interface IF-1. In a same way, the second internal bi-directional connection IBC-2 provides second electrical input signals from the second optical interface IF-2 to the second processing unit PU-2-PA and second electrical output signals from the second processing unit PU-2-PA to the second optical interface IF-1.

Figure 2:
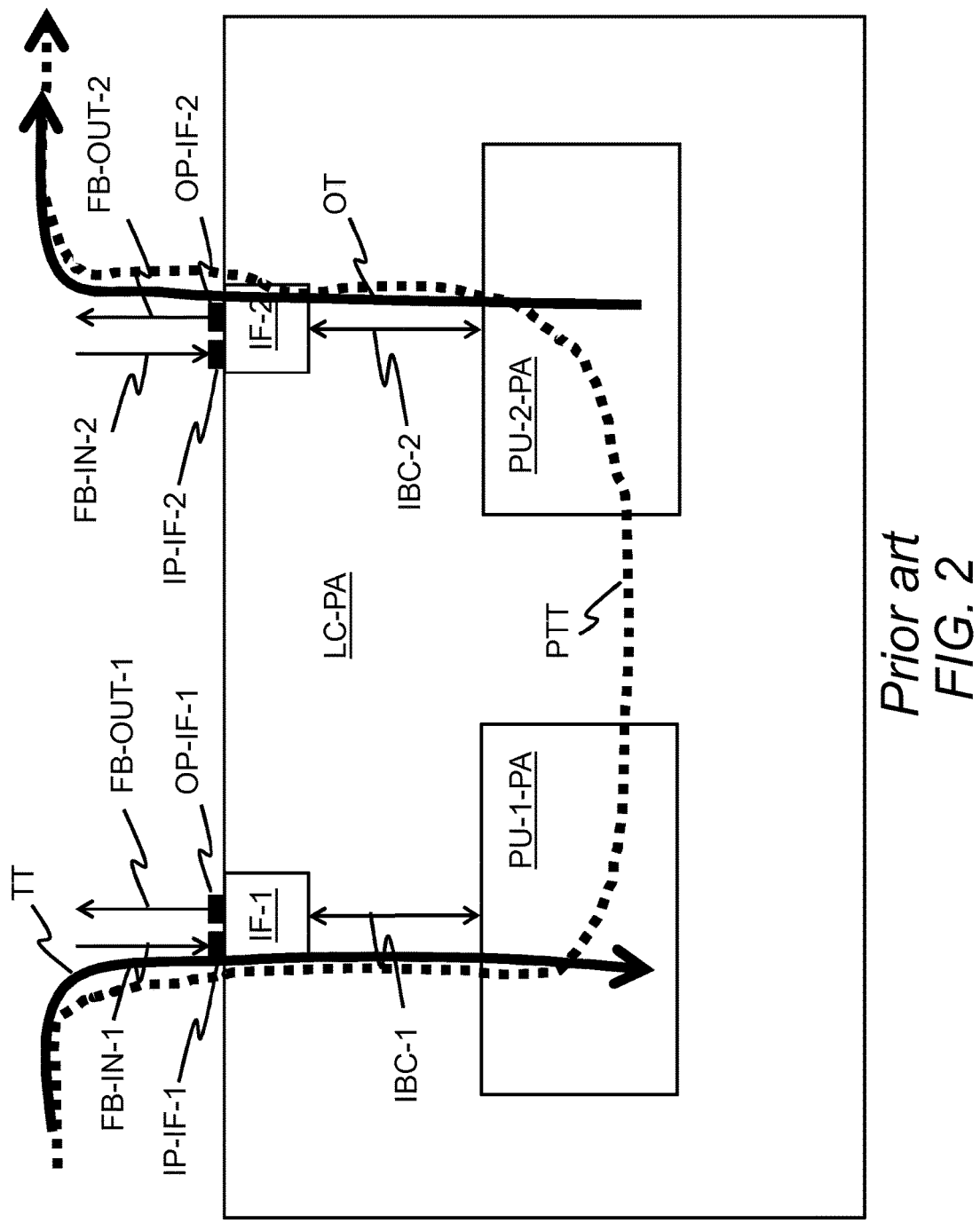
FIG. 2 shows schematically with respect to the line card of FIG. 1 how pass-through traffic, terminated traffic and originated traffic are handled by the line card.

FIG. 2 shows schematically with respect to the line card LC-PA of FIG. 1 how the pass-through traffic PTT, so-called terminated traffic TT and so-called originated traffic OT are handled by the line card LC-PA.

The terminated traffic TT is data traffic, which is extracted from one of optical input fibers FB-IN-1, FB-IN-2 by a corresponding one of the optical input/output interfaces IF-1, IF-2 and which is processed by one of the processing units PU-1-PA, PU-2-PA according to a network protocol which applies for example IP routing, Ethernet switching, OTN framing, OTN mapping and OTN switching. Exemplarily, a first optical input single wavelength signal modulated first input data traffic is received at the first optical interface IF-1 and is converted by the first optical interface IF-1 into the first electrical input signal. The first electrical input signal is provided from the first optical interface IF-1 via the first internal bi-directional connection IBC-1 to the first processing unit PU-1-PA which may identify in a first step a receiving address of the first input data traffic, detects in a second step the first input data traffic as the terminated traffic TT because the receiving address belongs to the line card LC-PA or to the network node which has installed the line card LC-PA and handles therefore in a third step the first input data traffic according to a corresponding network protocol as mentioned above exemplarily. This means that the first input data traffic may be forwarded for example to another optical input/output interface of the line card LC-PA such as the first input/output interface IF-1 or to another line card of the network node which has installed the line card LC-PA.

The originated traffic OT is further data traffic, which is added by one of the optical interfaces IF-1, IF-2 to a corresponding one of the optical output fiber FB-OUT-1, FB-OUT-2. A second electrical output signal modulated with the originated traffic OT may be provided for example from another line card of the network node to the second processing unit PU-2-PA which forwards the originated traffic OT via the second internal bi-directional connection IBC-2 to the second optical interface IF-2. The second optical interface IF-2 converts the second electrical output signal into a second optical output signal modulated with the originated traffic OT and outputs the originated traffic OT to the second optical output fiber FB-OUT-2.

The pass-through traffic PTT is even further data traffic, which is received via one of the optical input fibers FB-IN-1, FB-IN-2 at one of the optical interfaces IF-1, IF-2 and which is forwarded by another one of the optical interfaces IF-1, IF-2 via a corresponding one of the optical output fibers FB-OUT-1, FB-OUT-2. Such pass-through traffic PTT appears for example in so-called optical ring networks or ERP networks (ERP=Ethernet Ring Protection) in which each network node connects to exactly two other network nodes, forming a single continuous pathway for optical signals through each network node. Between an input network node inserting data traffic to the optical ring network and an output network node extracting the data traffic from the optical ring network each network node along the continuous pathway handles the data traffic. Exemplarily, a second optical input single wavelength signal modulated second input data traffic is received at the first optical interface IF-1 and is converted by the first optical interface IF-1 into a second electrical input signal. The second electrical input signal is provided from the first optical interface IF-1 via the first internal bi-directional connection IBC-1 to the first processing unit PU-1-PA which processes the second input data traffic according to methods known to skilled persons in the art insofar as to identify that the second input data traffic is the pass-through traffic PTT. In such a case, the identified pass-through traffic PTT may provided from the first processing unit PU-1-PA to the second processing unit PU-2-PA which further provides a second electrical output signal from the second processing unit PU-2-PA via the second internal bi-directional connection IBC-2 to the second optical interface IF-2. The second optical interface IF-2 converts the second electrical output signal into a second optical output signal and outputs the second optical output signal modulated with the pass-through traffic PTT to the second optical output fiber FB-OUT-2.

Figure 3:
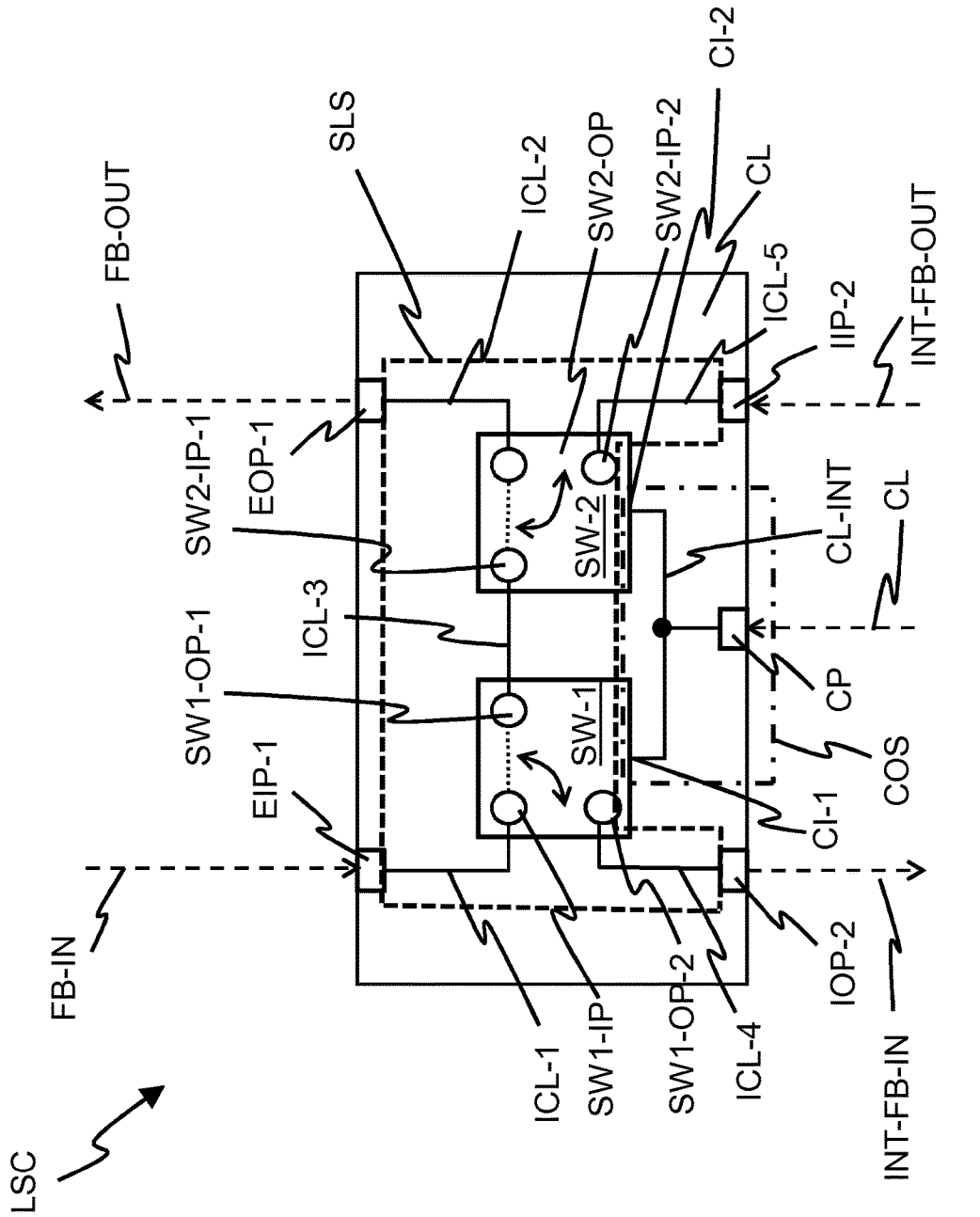
FIG. 3 shows schematically a block diagram of a line switching component with two switches for switching the line switching component between a first operation mode and a second operation mode according to an exemplarily embodiment of the invention.

FIG. 3 shows schematically a block diagram of a line switching component LSC which is switchable between a first operation mode and a second operation mode according to an exemplarily embodiment. Generally, the line switching component LSC may contain at least one first input port EIP-1, at least one first output port EOP-1, at least one second output port IOP-2, at least one second input port IIP-2 and a switchable optical path system SLS.

Figure 5:
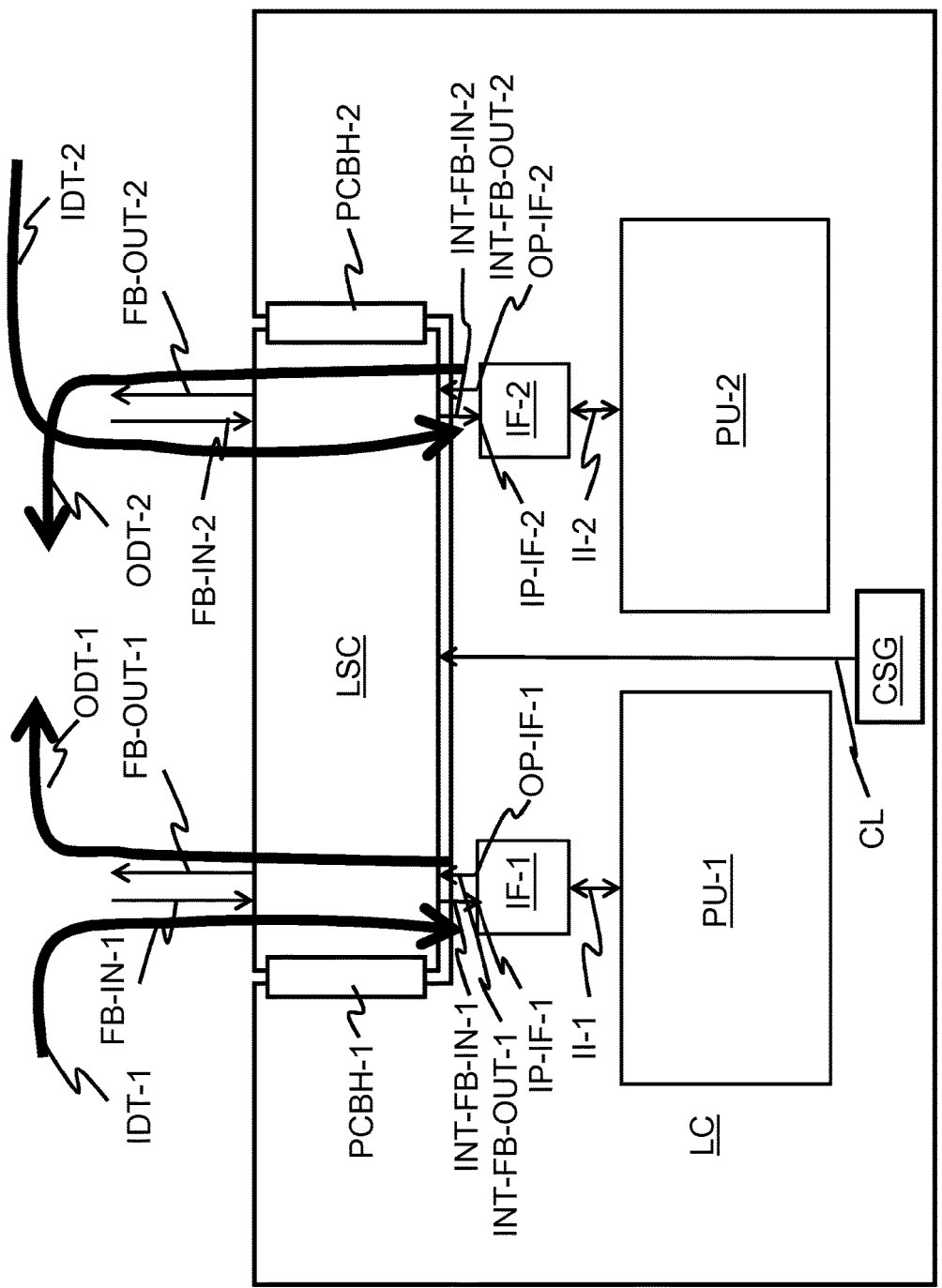
FIG. 5 shows schematically a block diagram of a line card which contains two interfaces, a line switching component mounted to the line card and connected to the two interfaces and two processing units each one connected to one of the two interfaces according to an exemplarily embodiment of the invention.

The at least one first input port EIP-1 is configured to receiving an optical input signal from the optical transport network via an optical input fiber FB-IN which may be the first optical input fiber FB-IN-1 or the second optical input fiber FB-IN-2 which are shown in FIG. 1 and FIG. 2. The at least one first output port EOP-1 is configured to transmit an optical output signal to the optical transport network via an optical output fiber FB-OUT which may be the first optical output fiber FB-OUT-1 the second optical output fiber FB-OUT-2 which are shown in FIG. 1 and FIG. 2. The at least one second output port IOP-2 is configured to be connected to an input port of one of the optical interfaces IF-1, IF-2 of a line card LC which is shown in FIG. 5. The at least one second input port IIP-2 is configured to be connected to an output port of one of the optical interfaces IF-1, IF-2 of the line card LC.

The switchable optical path system SLS is configured to operate the line switching component LSC in a first operation mode by receiving an optical input signal at the at least one first input port EIP-1 and by providing the optical input signal via the at least one second output port IOP-2 to one of the optical interfaces IF-1, IF-2 for further processing of the optical input signal at the one of the optical interfaces IF-1, IF-2 and by receiving an optical output signal from a further one of the optical interfaces IF-1, IF-2 at the at least one second input port IIP-2 for transmitting the optical output signal via the at least one output port EOP-1. The further processing may be a specific data handling functionality for handling input data and output data according to an applied transmission format such as SDH/Sonet, OTN, Ethernet or IP as described above with respect to FIG. 1. Such data handling functionalities are for example IP routing, Ethernet switching, OTN framing, OTN mapping or OTN switching, as well as the identification of the pass-through traffic PTT.

The switchable optical path system SLS is further configured to operate the line switching component LSC in a second operation mode by forwarding the optical input signal from the at least one first input port EIP-1 to the at least one first output port EOP-1 for transmitting the optical input signal as the optical output signal, when a malfunction has occurred at the line card LC or at a network node which contains the line card (see FIG. 9) or when the second operation mode has been enforced.

The line switching component LSC preferably contains at least one switch SW-1, SW-2 which is configured to provide the optical input signal to the at least one optical interface IF-1, IF-2 and to receive the optical output signal form the at least one optical interface IF-1, IF-2 during the first operation mode and to forward the optical input signal from the at least one input port EIP-1 to the at least one output port EOP-1 during the second operation mode.

A single switch may be based for example on an optical MEMS switch as described in Ming. C. Wu, "Optical bench technology holds promise", Electrical Engineering Department, University of California, Los Angeles, Jun. 3, 1999 (http://www.embedded.com/print/4038281). This optical MEMS switch contains an n×n array for a number n of input fiber and a number n of output fibers. Positions of the input fibers may be used to connect internal connection lines ICL-1, ICL-2 and positions of the output fibers may be used to connect further internal connection lines ICL-3, ICL-4, ICL-5. Alternatively, the at least one switch SW-1, SW-2 may be based on optical MEMS switches such as provided by Thorlabs (e.g. optical MEMS switch with product number OSW22-xxx-SM). The at least one switch SW-1, SW-2 may be for example a two-dimensional MEMS optical. "Two-dimensional" means that for example a micro mirror which is arranged in such a way that it can deflect an input optical signal received at one input port to one of two or more output ports which are arranged side by side.

When no electrical power is applied to the MEMS optical switches, all micro mirrors of a MEMS optical switch return to their initial state, e.g. bar state, so that all data traffic can bypass an operation failure at the line card LC or at the network node NN.

The line switching component LSC shown in FIG. 3 exemplarily contains a first switch SW-1 and a second switch SW-2.

The first input port EIP-1 and the first output port EOP-1 are external ports. "External" means that the first input port EIP-1 is configured to get connected with the optical input fiber FB-IN of the optical transport network and the first output port EOP-1 is configured to get connected with the optical output fiber FB-FB-OUT of the optical transport network.

The second input port IIP-2 and the second output port IOP-2 are internal ports. "Internal" means that the second output port IOP-2 and the second input port IIP-2 are configured to get connected preferably via intermediate fiber connections INT-FB-IN, INT-FB-OUT with corresponding ports of the optical interfaces IF-1, IF-2 of the line card LC shown in FIG. 5.

The first switch SW-1 contains the input port SW1-IP, the first output port SW1-OP-1, the second output port SW1-OP-2 and a control interface CI-1. The first switch SW-1 is configured to switch an internal transmission path between a first position connecting the input port SW1-IP and the first output port SW1-OP-1 and a second position connecting the input port SW1-IP and the second output port SW1-OP-2. Which one of the first position and the second position is selected depends on a signal form or an information content of a control signal which is applied to the control interface CI-1. The control signal may be an electrical signal or an optical signal.

The second switch SW-2 contains the first input port SW2-IP-1, the second input port SW2-IP-2, the output port SW2-OP and a control interface CI-2. The second switch SW-2 is configured to switch an internal transmission path between a further first position connecting the first input port SW2-IP-1 and the output port SW2-OP and a further second position connecting the second input port SW2-IP-2 and the output port SW2-OP. Which one of the further first position and the further second position is selected depends on the kind of the control signal which is applied to the control interface CI-2.

Note that the terms "input port" and "output port" do not imply any directionality of data traffic. The data traffic may flow from input port to output port, or from output port to input port. This may happen for example, if the input fibers FB-IN-1, FB-IN-2 and the output fibers FB-OUT-1-, FB-OUT-2 may be also applied for transmitting optical signals in backward direction.

The input port SW1-IP is connected via an internal connection line ICL-1 to the first input port EIP-1. The first output port SW1-OP-1 is connected via an internal connection line ICL-3 to the first input port SW2-IP-1. The output port SW2-OP is connected via an internal connection line ICL-2 to the first output port EOP-1. The second output port SW1-OP-2 is connected via an internal connection line ICL-4 to the second output port IOP-2. The second input port SW2-IP-2 is connected via an internal connection line ICL-5 to the second input port IIP-2.

The input ports EIP-1, IIP-2, the output ports EOP-1, IOP-2, and the ports SW1-IP, SW1-OP-1, SW1-OP-2, SW2-IP-1, SW2-IP-2, SW2-OP of the first switch SW-1 and the second switch SW-2 may be preferably implemented using connectors for connecting optical fibers.

In an alternative embodiment, a further line switching component may contain further one or several further external input port(s) and external output port(s) and one or several further internal input port(s) and internal output port(s) to provide a similar functionality of the line switching component shown in FIG. 3 for two or more optical input/output interfaces of a line card. Such further line switching component can be realized by each person skilled in the art based on the description of the line switching component shown in FIG. 3 and is therefore not shown for simplification.

Figure 9:
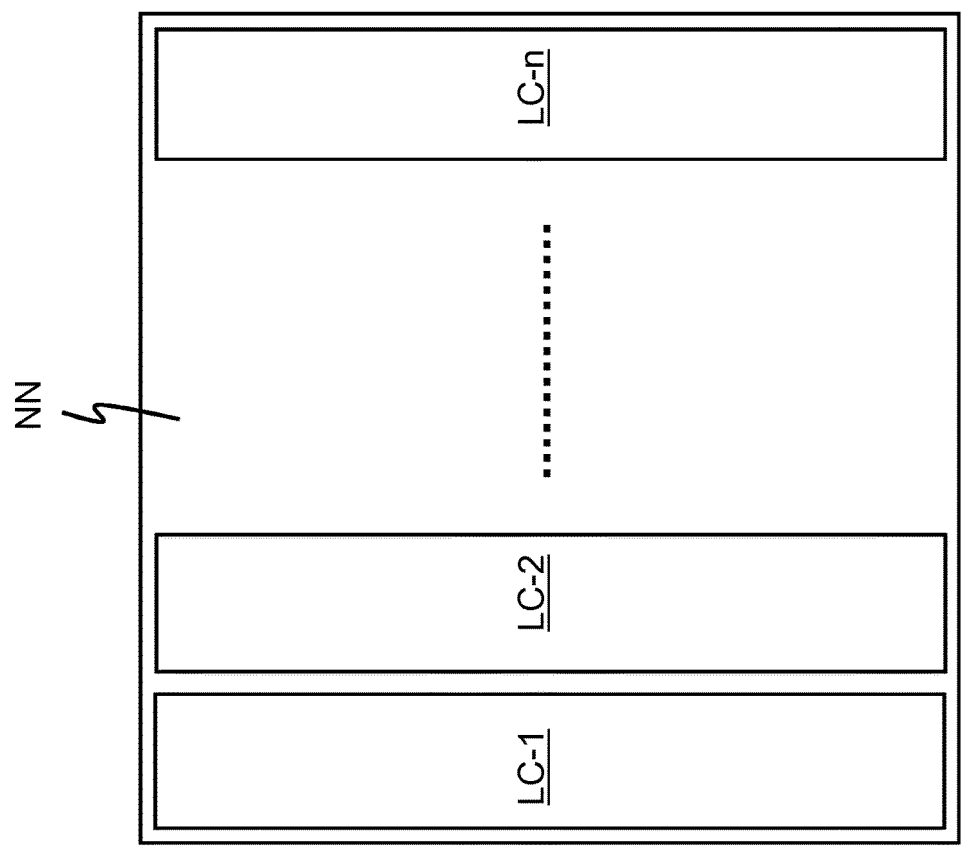
FIG. 9 shows schematically a block diagram of a network node which contains several line cards according to an exemplarily embodiment of the invention.

The line switching component LSC further contains a control system COS which is configured to observe a malfunction at the line card LC shown in FIG. 5 or at the network node NN shown in FIG. 9 or to observe an enforcement for the second operation mode based on a change of a control signal applied to the control system COS.

The control system COS may contain for example a control port CP, the control interfaces CI-1, CI-2 of the switches SW-1, SW-2 and an internal control line CL-INT which connects the control interfaces CI-1, CI-2 with the control port CP and which allows to apply the control signal to the control interfaces CI-1, CI-2.

When MEMS optical switches are used for the switches SW-1, SW-2, for example a power level P of the control signal being an electrical control signal is set to a predefined operation power level $P_{op}$ for a first operation mode which may be also called normal operation mode. The predefined power level is used as a bias for at least one micro actuator of at least one micro mirror of the MEMS optical switch and is selected in such a way that the at least one micro actuator moves the at least one micro mirror to a first predefined position which allows that an optical beam of an optical signal coming from the input port SW1-IP is deflected to the second output port SW1-OP-2 and that a further optical beam of a further optical signal coming from the second input port SW2-IP-2 is deflected to the output port SW2-OP. During the first operation mode, input data traffic IDT, IDT-1, IDT-2 (see FIG. 4 and FIG. 5) which is received by an optical input signal via one of the optical input fibers FB-IN, FB-IN-1, FB-IN-2 at the first input port EIP-1 is provided to the second output port IOP-2 (see FIG. 4 a and FIG. 5) for further processing at the interface IF-1, IF-2 (see FIG. 5). Furthermore during the first operation mode, output data traffic ODT, ODT-1, ODT-2 (see FIG. 4 and FIG. 5) which is provided by an optical output signal from one of the optical interfaces IF-1, IF-2 (see FIG. 5) to the line switching component LSC, LSC-1, LSC-2 is transmitted from the first output port EOP-1 via one of the optical output fibers FB-OUT, FB-OUT-1, FB-OUT-2 (see FIG. 4 a and FIG. 5).

The MEMS optical switches are configured for a second operation mode which may be also called pass-through operation mode in such a way, that for example a mechanical spring moves the at least one micro mirror to a second predefined position which allows that the optical beam of the optical signal coming from the input port SW1-IP is deflected to the first output port SW1-OP-1 and that the further optical beam of the further optical signal coming from the first input port SW2-IP-1 is deflected to the output port SW2-OP, when the control signal cannot be provided to the control port CP anymore and is not detectable anymore by the control system COS due to a malfunction of the line card LC or the network node NN or when the power level P of the electrical control signal is set to a predefined switch power level $P_{sw}$ which is smaller than the predefined operation power level due to an enforcement coming from and instructed by the line card LC or by the network node NN to switch to the second operation mode. During the second operation mode, the input data traffic IDT, IDT-1, IDT-2 which is received by the optical input signal via the optical input fiber FB-IN, FB-IN-1, FB-IN-2 at the first input port EIP-1 is forwarded to the first output port EOP-1 (see FIG. 4 b)) and is transmitted from the first output port EOP-1 by a further optical output signal via the optical output fiber FB-OUT, FB-OUT-1, FB-OUT-2 (see FIG. 4 b) and FIG. 6)

An exemplary relationship between the operation modes, power levels of the electrical control signal and switching states of the switches SW-1, SW-2 is summarized in following table 1:

TABLE 1

| Name of operation mode | Power level P of the electrical control signal | Switching status of first switch SW-1/ connected ports | Switching status of second switch SW-2/ connected ports |
| --- | --- | --- | --- |
| First operation mode or normal operation mode | $P = P_{op}$ | The input port SW1-IP and the second output port SW1-OP-2 | The second input port SW2-IP-2 and the output port SW2-OP |
| Second operation mode or pass-through operation mode | $P = 0$ or $P \leq P_{sw} < P_{op}$ | The input port SW1-IP and the first output port SW1-OP-1 | The first input port SW2-IP-1 and the output port SW2-OP |

The line switching component LSC as shown in FIG. 3 is shown exemplarily with a single input port EIP-1 and a single output port EOP-1 and is designed to be connected and to be applied for a single pass-through traffic from one of the optical interfaces IF-1, IF-2 to another one of the optical interfaces IF-1, IF-2. In further embodiments which are not shown for simplification, the line switching component LSC may be designed to be connected and to be applied for even more optical interfaces to handle further pass-through traffic between further optical interfaces. In such a case, the line switching component LSC may contain a corresponding number first input ports, first output ports, second output ports and second input ports. This is not shown for simplification and can be easily realised by a skilled person based on the description with respect to FIG. 3.

When the line switching component LSC is adapted to handle more than one pass-through traffic, the line switching component LSC preferably may be configured to operate the optical interfaces at a same time in same operation modes (e.g. the first operation mode or the second operation mode) or to operate the optical interfaces separately in opposite operation modes (e.g. operating two optical interfaces in the first operation mode and at a same time operating two further optical interfaces in the second operation mode for passing the pass-through traffic from one of the two further optical interfaces to another of two further optical interfaces). This can easily be done for example, by applying for each one of the interfaces a control signal and either inverting for example the power levels of the electrical control signals or by inverting the default states of the switches SW-1, SW-2 for corresponding optical interfaces . . . .

The line switching component LSC can be used for any type of optical transmission signal of any bit rate which is received via the optical input fiber FB-IN because the data traffic is handled within the line switching component LSC only optically, i.e. the data traffic is not converted into an electrical signal. Thus, the line switching component LSC is fully transparent to the bit rate, baud rate, modulation format, wavelength etc. of the optical signals. The line switching component LSC is applicable to a single wavelength as well as to a predefined wavelength range.

The line switching component LSC is shown for simplification only for a single optical input fiber FB-IN and a single optical output fiber FB-OUT. The optical input fiber FB-IN may correspond for example to the first optical input fiber FB-IN-1 and the optical output fiber FB-OUT may correspond for example to the second optical output fiber FB-OUT-2. In case of bidirectional optical interfaces IF-1, IF-2 (see FIG. 5) the line switching component LSC may contain a further set of components such as further switches and further internal connection lines for allowing a second operation mode with pass through traffic PTT form the second optical input fiber FB-IN-2 to the first optical output fiber FB-OUT-1. In such a case the switches SW-1, SW-2 may be configured to handle also the first operation mode and the second operation mode for the opposite transmission direction of optical signals. These embodiments can be easily realised by a skilled person based on the description with respect to FIG. 3.

Figure 4:
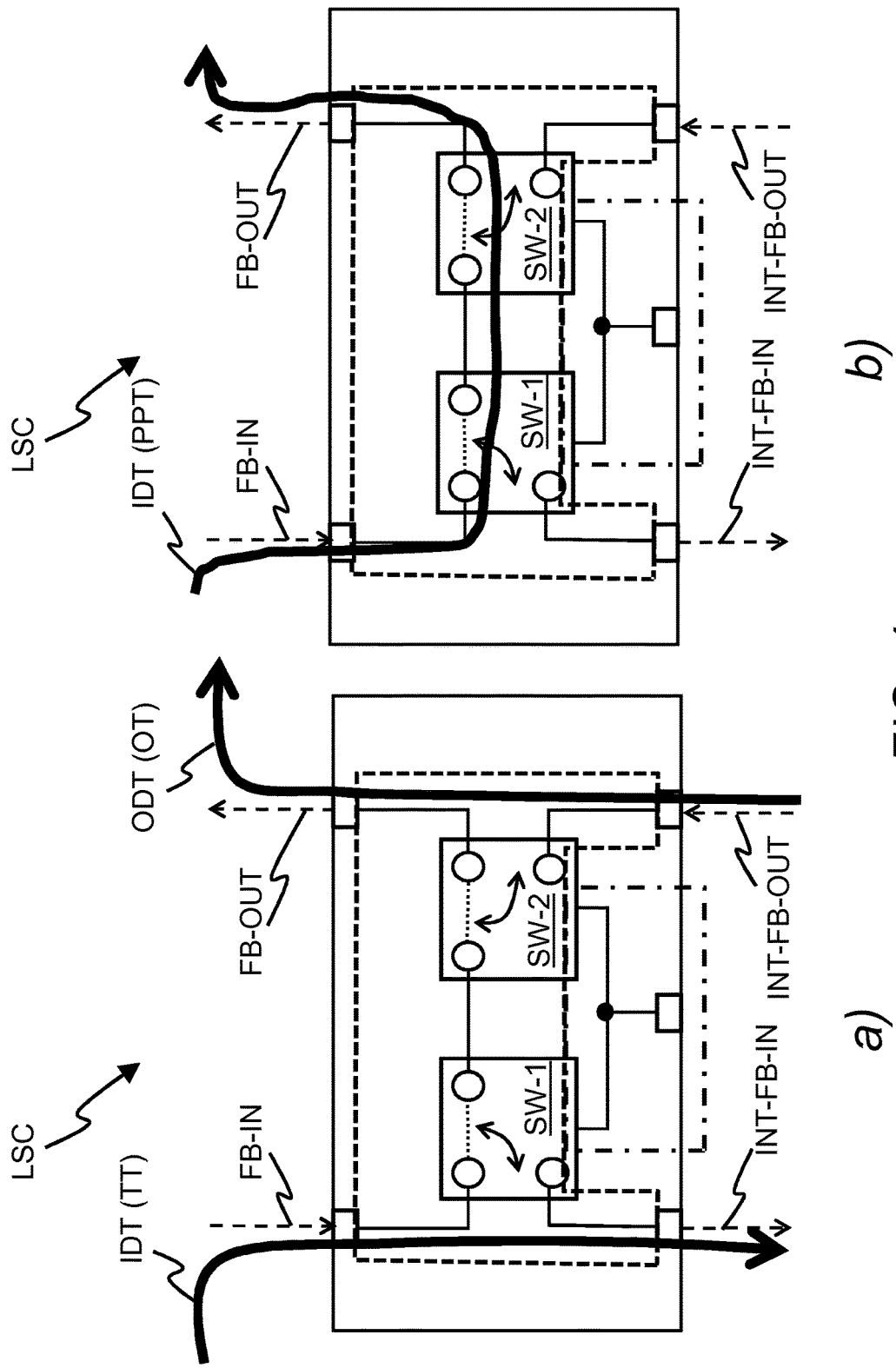
FIG. 4 a) shows schematically with respect to the line switching component of FIG. 3 a first internal transmission path for input data traffic and a second internal transmission path for output data traffic when the two switches are adjusted according to the first operation mode.

FIG. 4 *a*) shows schematically with respect to the line switching component LSC of FIG. 3 a first internal transmission path for the input data traffic IDT which may be terminated traffic TT described above with respect to FIG. 2 and a second internal transmission path for the output data traffic ODT which may the originated traffic OT also described above with respect to FIG. 2 when the two switches SW-1, SW-2 are adjusted according to the first operation mode.

The first switch SW-1 and the second switch SW-2 are configured to connect the input port EIP-1 to the output port IOP-2 via the input port SW1-IP of the first switch SW-1 and the second output port SW1-OP-2 of the first switch SW-1 and to connect the input port IIP-2 to the output port EOP-1 via the second input port SW2-IP-1 of the second switch SW-2 and the output port SW2-OP of the second switch SW-2. Thereby, the switches SW-1, SW-2 are configured to provide the first internal transmission path and the second internal transmission path during the first operation mode.

FIG. 4 *b*) shows schematically with respect to the line switching component LSC of FIG. 3 a further internal transmission path for the input data traffic IDT which may be the pass through traffic PTT also described above with respect to FIG. 2 when the two switches SW-1, SW-2 are adjusted according to the second operation mode.

The first switch SW-1 and the second switch SW-2 are further configured to connect the input port EIP-1 to the output port EOP-1 via the input port SW1-IP of the first switch SW-1, the first output port SW1-OP-1 of the first switch SW-1, the first input port SW2-IP-1 of the second switch SW-2 and the output port SW2-OP of the second switch SW-2. Thereby, the switches SW-1, SW-2 are configured to provide the further internal transmission path during the second operation mode.

FIG. 5 shows schematically a block diagram of the line card LC according to an exemplarily embodiment. The line card LC contains the two optical interfaces IF-1, IF-2 for receiving optical input signals from the optical transport network at input ports IP-IF-1, IP-IF-2 of the optical interfaces IF-1, IF-2 and for transmitting optical output signals to the optical transport network from output ports OP-IF-1, OP-IF-2 of the optical interfaces IF-1, IF-2. The two optical interfaces IF-1, IF-2 may be preferably bidirectional optical interfaces, e.g. 10GE, as per IEEE standards and so-called MSAs (MSA=Multi-source agreement which is a de facto standard for pluggable optics).

The line card LC further contains the line switching component LSC. Alternatively, a line switching component LSC-a may be applied which is described below with respect to FIG. 7.

The line card LC may further contain internal fiber connections INT-FB-IN-1, INT-FB-IN-2 for connecting the second output ports IOP-2 of the line switching component LSC with the input ports IP-IF-1, IP-IF-2 of the optical interfaces IF-1, IF-2 and further internal fiber connections INT-FB-OUT-1, INT-FB-OUT-2 for connecting the second input ports IIP-2 of the line switching component LSC with the output ports OP-IF-1, OP-IF-2 of the optical interfaces IF-1, IF-2 as sketched in FIG. 5. As already discussed above, the line switching component LSC shown in FIG. 3 needs to be configured and extended with similar internal connection lines to provide the further internal transmission paths also in backward direction.

Alternatively, the line switching component LSC may be directly connected to the two optical interfaces IF-1, IF-2 which is not shown for simplification.

The line card LC may further contain processing units PU-1, PU-2 and further internal connection lines II-1, II-2. Each one of the processing units PU-1, PU-2 may be connected to an electrical interface of one of the optical interfaces IF-1, IF-2 via one of the further internal connection lines II-1, II-2. Alternatively, the processing units PU-1, PU-2 may be directly connected to the electrical interfaces of the optical interfaces IF-1, IF-2. The processing units PU-1, PU-2 provide a similar functionality as described with respect to the processing units PU-1-PA, PU-2-PA which are described above with respect to FIG. 1.

Preferably, the line card LC further contains a control signal generation unit CSG and the control line CL between the control signal generation unit CSG and the line switching component LSC. The control signal generation unit CSG may be configured to provide the control signal via the control line CL to the control port CP of the line switching component LSC.

Figure 7:
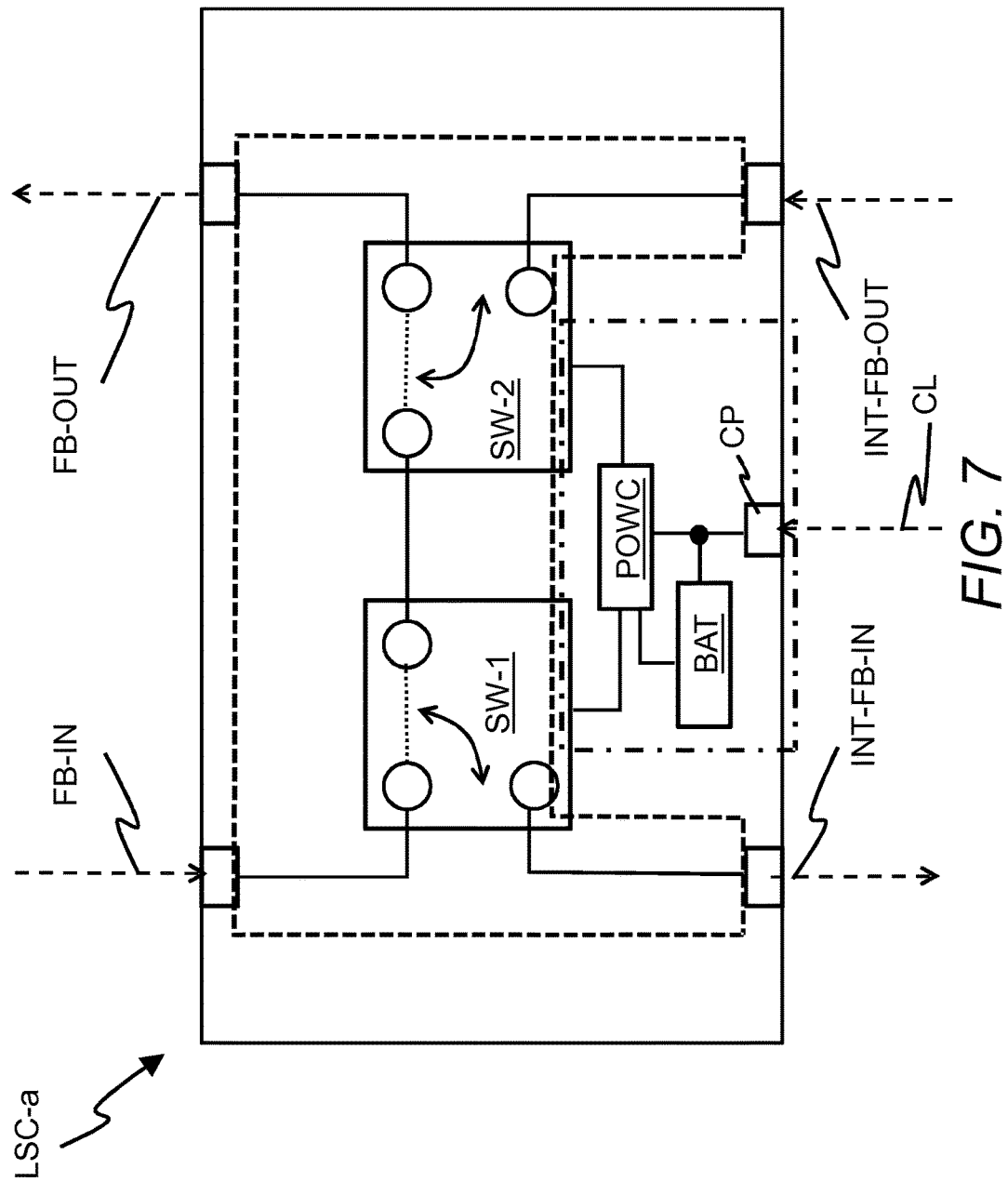
FIG. 7 shows schematically a block diagram of a line switching component with two switches for switching the line switching component between a first operation mode and a second operation mode according to a further exemplarily embodiment of the invention.

The control signal generation unit CSG and the control line CL may be further preferably applied for charging a capacitor or a battery of the line switching component LSC-a (see FIG. 7 and corresponding description).

Alternatively, one of the processing units PU-1, PU-2 may contain the control signal generation unit for generating the control signal for the control system COS of the line switching component LSC. This embodiment is not shown for simplification.

A control signal protocol between line card LC (e.g. the control signal generation unit CSG) and the line switching component LSC can have several potential implementations, e.g. be a permanent constant power signal as long as the line card LC is working properly, or a periodic signal with a predefined frequency indicating its working state, etc. The invention precludes no mechanism and signal forms as long as it supports the switching between the first operation mode and the second operation mode.

In a preferred embodiment, the line card LC further contains mounting fixtures PCBH-1, PCBH-2 which are configured to mount the line switching component LSC-1 at the line card LC. This means, that the line switching component LSC is a replaceable plug-in component for the line card LC.

The mounting fixtures PCBH-1, PCBH-2 may be for example PCB holders with a H-profile. One side of the H-profile is fixed to the line card LC and the other open part of the H-profile is used to insert for example an edge of a ground plate of the line switching component LSC-2. Alternatively, the line switching component LSC is mounted to the line card LC by a cage as applied for MSAs or simply by the fiber connectors which are applied for connecting the line switching component LSC to the line card LC.

When the line switching component LCS is mounted to the line card LC and when the line switching component LCS is operated in the first operation mode, first input data traffic IDT-1 is received from the optical transport network via the first optical input signals at the line switching component LCS and is provided to the first optical interface IF-1, first output data traffic ODT-1 is provided from the first optical interface IF-1 to the line switching component LCS and is transmitted by the first optical output signals to the optical transport network, second input data traffic IDT-2 is received from the optical transport network via the second optical input signals at the line switching component LCS and is provided to the second optical interface IF-2, and second output data traffic ODT-2 is provided from the second optical interface IF-2 to the line switching component LCS and is transmitted by the second optical output signals to the optical transport network.

The first input data traffic IDT-1 and the second output data traffic ODT-2 may represent first bidirectional traffic indicated by an arrow coming from the left side for the first input data traffic IDT-1 and by a further arrow being directed to the left side for the second output data traffic ODT-2. In a same way, the second input data traffic IDT-2 and the first output data traffic ODT-1 may represent second bidirectional traffic indicated by an arrow coming from the right side for the second input data traffic IDT-1 and by a further arrow being directed to the right side for the first output data traffic ODT-1.

According to alternative embodiments which are not shown for simplification, further line cards may contain a similar layout for more than two optical interfaces.

Figure 6:
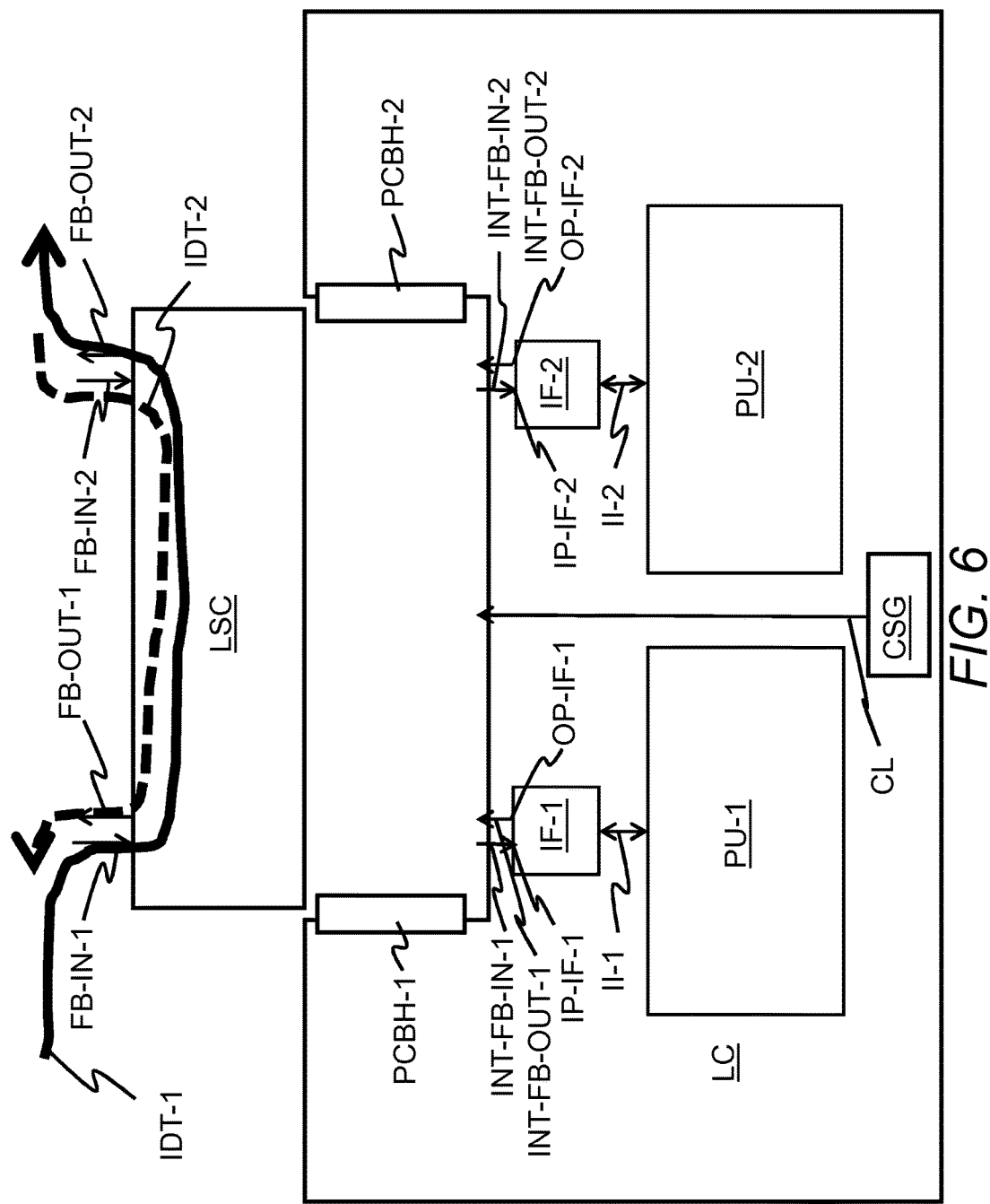
FIG. 6 shows schematically the line card of FIG. 5, when the line switching components are disconnected from the line card.
Figure 8:
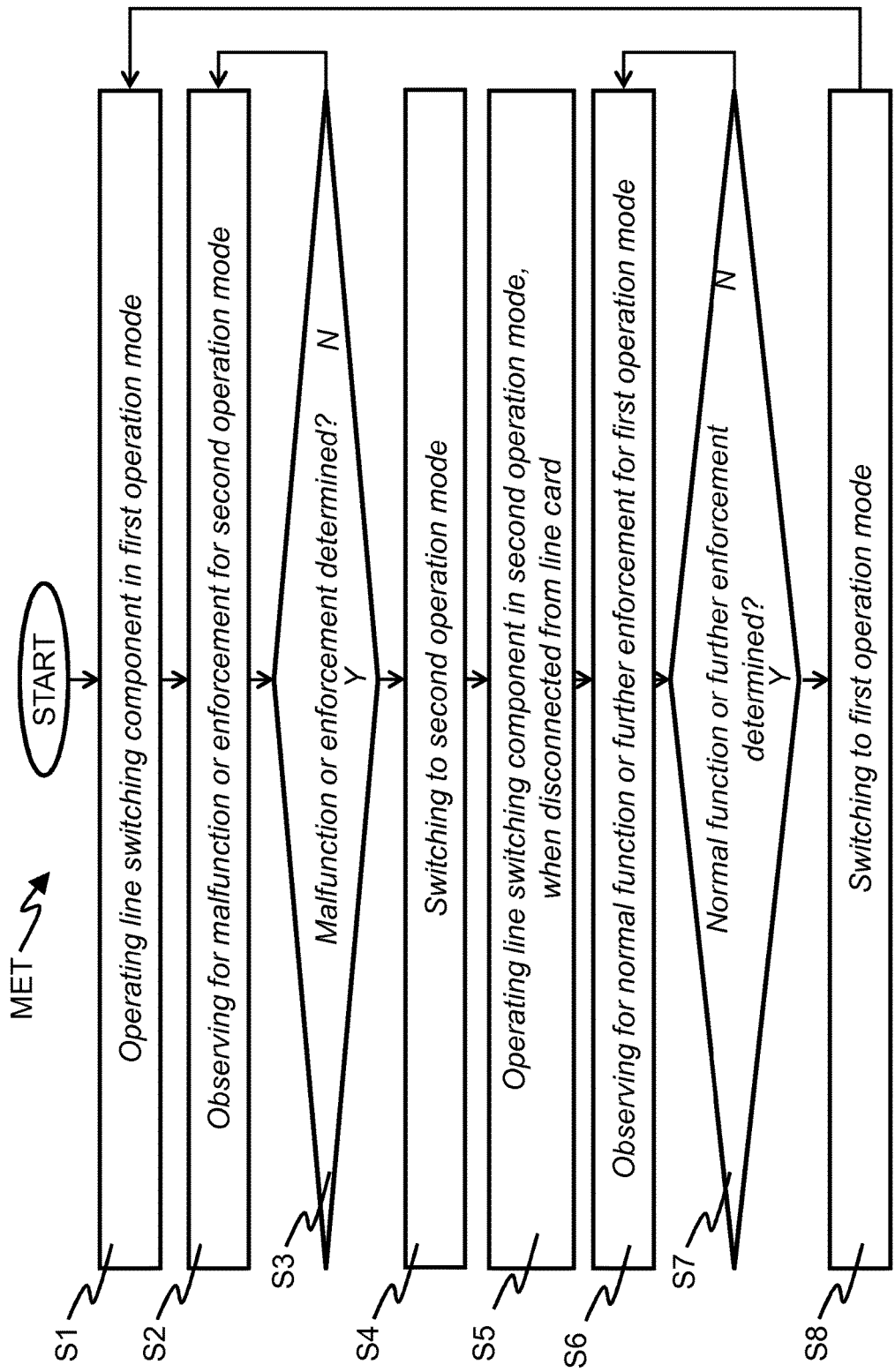
FIG. 8 shows schematically a flow diagram of a method for operating a line switching component of a line card of a network node according to an exemplarily embodiment of the invention.

FIG. 6 shows schematically the line card LC of FIG. 5, when the line switching component LCS is disconnected from the line card LC. In such a case, no electrical control signal is supplied from the control signal generation unit CSG-1 to the control system COS of the line switching component LCS. This means, that the line switching component LSC is configured to operate passively in the second operation mode without any power supplied to the line switching component LSC, when the line switching component LSC is disconnected from the line card LC. Alternatively, when the line switching component LSC-a as discussed below with respect to FIG. 8 is applied instead of the line switching component LSC, the line switching component LSC-a is operated actively in the second operation mode by using an internal power supply of the line switching component LSC-a.

The first input data traffic IDT-1 is received from the optical transport network as the first optical input signals via the first optical input fiber FB-IN-1 and is directly forwarded as the first optical output signals via the second optical output fiber FB-OUT-2 back to the optical transport network. In a same way and in backward direction, the second input data traffic IDT-2 is received from the optical transport network as the second optical input signals via the second optical input fiber FB-IN-2 and is directly forwarded as the second optical output signals via the first optical output fiber FB-OUT-1 back to the optical transport network.

This means that all data traffic is handled by the line switching component LSC as transit traffic so that a data connection to neighbouring network elements is maintained even if the line card LC or the network node NN does not work anymore or have processing failures which does not allow anymore a normal operation mode or are not fully operable anymore. Thereby, the defect of the line card LC or the network node NN is bypassed.

FIG. 7 shows schematically a block diagram of the line switching component LSC-a which applies the two switches SW-1, SW-2 for switching the line switching component LSC-a between the first operation mode and the second operation mode according to a further exemplarily embodiment.

The line switching component LSC-a may have a similar layout as the line switching component LSC which is shown in FIG. 3. The line switching component LSC-a further contains an electrical component BAT for storing electrical power and a power controller POWC. The electrical component BAT for storing the electrical power may be for example a capacitor or a rechargeable battery. The electrical component BAT is configured to provide the electrical control signal to the control system COS, when the line switching component LSC-a is disconnected from the line card. Preferably, the line switching component LSC-a further contains a power controller POWC which is configured to provide the control signal with either with a predefined power level $P_{nom}$ or a predefined power level $P_{fom}$ which needs to be applied to keep the switches SW-1, SW-2 in either a switching mode for the first operation mode (e.g. based on the predefined power level $P_{nom}$) or the second operation mode (e.g. based on the predefined power level $P_{fom}$). The power controller POWC is connected to the control port CP, the electrical component BAT and the control interfaces CI-1, CI-2 of the switches SW-1, SW-2.

Regarding the embodiment shown in FIG. 7, the switches SW-1, SW-2 may be preferably so-called LCoS switches (LCoS=Liquid Crystal on Silicon). In comparison to the MEMS optical switches, which do not need any electrical control signal to be operated in the second operation mode the LCoS switches always require a predefined power level of the electrical control signal to work either in the first operation mode or the second operation mode.

The MEMS optical switches as well as the LCoS switches imply no restriction to a timing behaviour of the electrical control signal and reaction of the line switching components LSC, LSC-a. Preferably, the electrical control signal and the switching time of the line switching component LSC-LSC-a support a very quick reaction on line card failures, e.g. less than 50 msec time between detection of the line card failure and the completion of the switching from the first operation mode to the second operation mode.

The LCoS switches are miniaturized reflective active-matrix liquid-crystal displays or so-called microdisplays which use a liquid crystal layer on top of a silicon backplane. The LCoS switches may be for example WSSs (WSS=wavelength selective switch) which may be based for example on designs such as provided by Finisar (e.g. product with name "EWPf Flexgrid enabled edge wavelength processor WSS"). Using such a WSS allows an embodiment, in which for a example a single optical wavelength of predefined optical frequency range is operated in the first operation mode and all further optical wavelengths of the predefined optical frequency range are operated in the second operation mode.

A relationship between the operation modes, power levels of the electrical control signal and switching states of the switches SW-1, SW-2 being LCoS switches is summarized in following table 2:

preferably executed when the line switching component LSC, LSC-a is connected to the line card LC.

In a further step S2, the control system COS of the line switching component LSC, LSC-a for example may observe preferably continuously the electrical control signal for a change for the power level, which may be a hint that a malfunction at the line card LC or at the network node NN has been occurred or that the line switching component LSC, LSC-a shall be required explicitly to switch from the first operation mode to the second operation mode. The malfunction may be observed for example, when the electrical control signal has a zero power level and the electrical control signal is not detectable any more. The enforcement may be observed for example, when the power level of the electrical control signal is explicitly changed to the zero power level (e.g. when MEMS optical switches for the switches SW-1, SW-2 are applied) or changed to the predefined power level $P_{fom}$ which is for example smaller than the predefined power level $P_{nom}$ for the first operation mode (e.g. when LCoS switches are applied for the switches SW-1, SW-2).

In a next step S3, it is determined whether the malfunction has been occurred or an enforcement is received to switch

TABLE 2

| Name of operation mode | Power level P of the electrical control signal | Switching status of first switch SW-1/ connected ports | Switching status of second switch SW-2/ connected ports |
| --- | --- | --- | --- |
| First operation mode or normal operation mode | $P = P_{nom}$ | The input port SW1-IP and the second output port SW1-OP-2 | The second input port SW2-IP-2 and the output port SW2-OP |
| Second operation mode or pass through operation mode | $P = P_{fom}$ | The input port SW1-IP and the first output port SW1-OP-1 | The first input port SW2-IP-1 and the output port SW2-OP |

The predefined power level $P_{nom}$ may be applied for the first operation mode and the further predefined power level $P_{fom}$ which may be preferably smaller than the predefined power level $P_{nom}$ may be applied for the second operation mode.

The LCoS switch is operated in the second operation mode by the electrical component PSM, when the line switching component LSC-a is disconnected from the line card.

FIG. 8 shows schematically a flow diagram of a method MET for operating the line switching component LCS (see FIG. 3), LCS-a (see FIG. 7) of the line card LC (see FIG. 5 and FIG. 6) of the network node NN (see FIG. 9) according to an exemplarily embodiment. The method MET may start with a first step S1 of operating the line switching component LSC, LSC-a in the first operation mode. Alternatively, the method MET may start with an operation of the line switching component LSC, LSC-a in the second operation mode, e.g. represented by a step S5.

In the first step S1, the line switching component LSC, LSC-a is operated in a first operation mode by receiving from the optical transport network optical input signals at one or several optical interface(s) IF-1, IF-2 of the line card LC via the line switching component LSC, LSC-a for further processing of the optical input signals at the one or several optical interface(s) IF-1, IF-2 and by transmitting optical output signals from the one or several optical interface(s) IF-1, IF-2 via the line switching component LSC, LSC-a to the optical transport network. The first step S1 may be explicitly the line switching component LSC, LSC-a from the first operation mode to the second operation mode.

If no malfunction or no enforcement has been determined (e.g. no change of the electrical control signal), the step S2 is repeated again. Else when the malfunction or the enforcement has been determined, step S4 may be a further step.

By the further step S4, the line switching component LSC, LSC-a is switched preferably automatically to the second operation mode by using the switchable optical path system SLS as described above with respect to FIGS. 3, 4 and 6.

In the next step S5, the line switching component LSC, LSC-a is operated in the second operation mode by forwarding the optical input signals from the input port EIP-1 of the line switching component LSC, LSC-a preferably internally to the output port EOP-1 of the line switching component LSC, LSC-a for transmitting the optical input signals as the optical output signals. The first step S5 may be preferably executed, when the line switching component LSC, LSC-a is disconnected from the line card LC but is also executed, when the line switching component LSC, LSC-a is still connected to the line card LC and for example as long as the line card LC or the network node NN have not been repaired or replaced. During the step S5 the line card LC having an operation failure can be replaced by another line card having no operation failure.

In a further step S6, the control system COS of the line switching component LSC, LSC-a for example may again observe preferably continuously the electrical control signal for a change for the power level, which may be a hint that the line card LC or the network node NN are again working in normal operation or that the line switching component LSC, LSC-a shall be required explicitly to switch from the second operation mode to the first operation mode. A normal operation mode or working operation mode of the line card LC may be observed for example, when the electrical control signal has the predefined power level $P_{op}$ or the predefined power level $P_{nom}$. The enforcement may be observed for example, when the power level of the electrical control signal is explicitly changed to the predefined power level $P_{op}$ (e.g. when MEMS optical switches for the switches SW-1, SW-2 are applied) or changed to the predefined power level $P_{fom}$ which may be larger than the predefined power level $P_{fom}$ for the second operation mode (e.g. when LCoS switches are applied for the switches SW-1, SW-2).

In a next step S7, it is determined whether the line card LC or the network node NN are again in normal operation or no further enforcement is received to switch explicitly the line switching component LSC, LSC-a from the second operation mode to the first operation mode.

If no normal function or a further enforcement has been determined (e.g. no change of the electrical control signal), the step S6 is repeated again. Else when a normal operation mode or no further enforcement has been determined, step S8 may be a further step.

By the further step S8, the line switching component LSC, LSC-a is switched preferably automatically to the first operation mode by using the switchable optical path system SLS as described above with respect to FIGS. 3, 4 and 5.

A further step after the step S8 may be again the step S1.

FIG. 9 shows schematically a block diagram of the network node NN which contains one line card LC-1 or several line cards LC-1, LC-2, . . . LC-n according to an exemplarily embodiment. Each of the line card LC-1, LC-2, . . . LC-n may have be designed for example according to the embodiments which are described above with respect to FIG. 3 or FIG. 7. The network node NN may contain other components such as switch cards, controller or power supplies, these are not shown for simplification.

The network node NN may be for example an IP router, an Ethernet switch, a SDH/Sonet cross/connect, an OTN cross-connect, a WDM system, etc., or a combination of several of these functions.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for transmitting", "means for receiving", "means for determining" etc. (performing a certain function) shall be understood as functional blocks comprising circuitry that is adapted for performing a certain function, respectively. Hence, a "means for s.th." may as well be understood as a "means being adapted or suited for s.th.". A means being adapted for performing a certain function does, hence, not imply that such means necessarily is performing said function (at a given time instant).

Functions of various elements shown in the figures, including any functional blocks may be provided through the use of dedicated hardware, as e.g. a processor, as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that the method MET disclosed in the specification or in the claims may be implemented by a device having means for performing each of the respective steps of these methods.

Preferably, a computer program product may contain computer-executable instructions for performing the method MET, when the computer program product is executed on at least one programmable hardware device such as a DSP, an ASIC or an FPGA. Preferably, a digital data storage device may encode a machine-executable program of instructions to perform the method MET.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

The invention claimed is:

1. A line switching component connected to a line card of a network node, said line switching component comprising:
   at least one input port configured to receive a single wavelength optical input signal from an optical transport network, at least one output port configured to transmit an optical output signal to said optical transport network, at least one further output port configured to be connected to an input port of an optical interface of said line card, at least one further input port configured to be connected to an output port of at least one further optical interface of said line card, and a switchable optical path system configured to operate said line switching component in a first operation mode, wherein said switchable optical path system is configured to receive said single wavelength optical input signal at said at least one input port and to provide said single wavelength optical input signal via said at least one further output port to said optical interface for further processing of said single wavelength optical input signal at said optical interface and to receive said optical output signal from said at least one further optical interface at said at least one further input port to transmit said optical output signal via said at least one output port, and to operate said line switching component in a second operation mode, wherein said switchable optical path system is configured to forward said single wavelength optical input signal from said at least one input port to said at least one output port to transmit said single wavelength optical input signal as said optical output signal, when a malfunction has occurred at said line card or at said network node or when said second operation mode has been enforced, and wherein said line switching component is separable from said line card.

2. The line switching component according to claim 1, further comprising a control system configured to observe a malfunction at said line card or at said network node or to observe an enforcement for said second operation mode based on a change of a control signal applied to said control system.

3. The line switching component according to claim 1, wherein said switchable optical path system comprises at least one switch configured to provide said single wavelength optical input signal to said at least one optical interface and to receive said optical output signal from said at least one further optical interface during said first operation mode and to forward said single wavelength optical input signal from said at least one input port to said at least one output port during said second operation mode.

4. The line switching component according to claim 3, wherein said switchable optical path system further comprises at least one further switch, and wherein said at least one switch and said at least one further switch are configured to connect said at least one input port to said at least one further output port via an input port of said at least one switch and a second output port of said at least one switch and to connect said at least one further input port to said at least one output port via a second input port of said at least one further switch and an output port of said at least one further switch during said first operation mode, and wherein said at least one switch and said at least one further switch are further configured to connect said at least one input port to said at least one output port via said input port of said at least one switch, a first output port of said at least one switch, a first input port of said at least one further switch and an output port of said at least one further switch during said second operation mode.

5. The line switching component according to claim 3, wherein said at least one switch is configured to require a predefined supply voltage for said first operation mode and no supply voltage for said second operation mode.

6. The line switching component according to claim 2, further comprising an electrical component to store electrical energy and to provide said electrical energy to said at least one switch during said second operation mode.

7. The line switching component according to claim 6, further comprising a power controller to provide a predefined power level from said electrical component to said at least one switch during said second operation mode.

8. The line switching component according to claim 7, wherein said at least one switch is a wavelength selective switch, and wherein said wavelength selective switch is configured to operate at least one first optical wavelength of said single wavelength optical input signal in said first operation mode and at least one second optical wavelength of said single wavelength optical input signal in said second operation mode.

9. The line switching component according to claim 1, wherein said line switching component is configured to operate at least one data interface and at least one further data interface of said line card at a same time in same operation modes of said first operation mode and said second operation mode, or to operate one of said at least one data interface and said at least one further data interface in said first operation mode and a further one of said at least one data interface and said at least one further data interface in said second operation mode.

10. The line switching component according to claim 1, wherein said line switching component is a replaceable plug-in component for said line card.

11. A line card for a network node comprising:
at least one optical interface configured to receive a single wavelength optical input signal from an optical transport network at an input port of said at least one optical interface, at least one further optical interface configured to transmit an optical output signal to said optical transport network from an output port of said at least one optical interface, and at least one separable line switching component connected to said at least one optical interface and to said at least one further optical interface, wherein said at least one separable line switching component is configured to receive said single wavelength optical input signal.

12. The line card according to claim 11, further comprising at least one mounting fixture configured to mount said at least one separable line switching component at said line card.

13. The line card according to claim 11, further comprising at least one control signal generation unit configured to provide a control signal to said at least one separable line switching component for setting an operation mode at said at least one separable line switching component.

14. A network node comprising at least one line card according to claim 11.

15. A method for operating a line switching component associated with a line card of a network node comprising:
when said line switching component is connected to said line card, operating said line switching component in a first operation mode by receiving from an optical transport network a single wavelength optical input signal at an at least one optical interface of said line card via said line switching component for further processing of said single wavelength optical input signal at said at least one optical interface and by transmitting an optical output signal from at least one further optical interface via said line switching component to said optical transport network, observing a malfunction at said line card or at said network node or an enforcement for switching said line switching component from said first operation mode to a second operation mode, and when said line switching component is disconnected from said line card, operating said line switching component in said second operation mode by forwarding said single wavelength optical input signal from an input port of said line switching component to an output port of said line switching component for transmitting said single wavelength optical input signal as said optical output signal, when said malfunction has been determined or when said enforcement has been determined, wherein said line switching component is separable from said line card.

16. The line switching component according to claim 1, wherein said switchable optical path system is configured to deflect said single wavelength optical input signal received at said at least one input port to one of two or more output ports which are arranged side by side.

17. The line switching component according to claim 16, wherein said switchable optical path system comprises a micro-mirror to deflect said single wavelength optical input signal received at said at least one input port.

18. The line switching component according to claim 1, wherein said line switching component is configured to operate in said second mode when disconnected from said line card.

* * * * *